(12) United States Patent
Lopez

(10) Patent No.: US 10,864,842 B2
(45) Date of Patent: Dec. 15, 2020

(54) TRANSFORMABLE MOBILE ROOM

(71) Applicant: Raul Fernandez Lopez, Mexico City (MX)

(72) Inventor: Raul Fernandez Lopez, Mexico City (MX)

( * ) Notice: Subject to any disclaimer, the term of this patent is extended or adjusted under 35 U.S.C. 154(b) by 171 days.

(21) Appl. No.: 16/238,317

(22) Filed: Jan. 2, 2019

(65) Prior Publication Data

US 2020/0017014 A1 Jan. 16, 2020

(30) Foreign Application Priority Data

Jul. 12, 2018 (MX) .................... MX/a/2018/008610

(51) Int. Cl.
| | |
|---|---|
| *B60P 3/34* | (2006.01) |
| *B60P 3/36* | (2006.01) |
| *B60P 3/025* | (2006.01) |
| *B62D 21/14* | (2006.01) |
| *B60R 15/04* | (2006.01) |

(52) U.S. Cl.
CPC ............... *B60P 3/34* (2013.01); *B60P 3/0252* (2013.01); *B60P 3/0257* (2013.01); *B60P 3/36* (2013.01); *B60R 15/04* (2013.01); *B62D 21/14* (2013.01)

(58) Field of Classification Search
CPC ........... B60P 3/0252; B60P 3/025; B60P 3/34; B60P 3/0257; B60P 3/36; B62D 21/14; B60R 15/04
USPC ................................ 296/26.01, 26.12, 26.13
See application file for complete search history.

(56) References Cited

U.S. PATENT DOCUMENTS

| | | | | | |
|---|---|---|---|---|---|
| 2,704,223 | A | * | 3/1955 | Houdart | B60P 3/34 296/26.13 |
| 2,842,972 | A | * | 7/1958 | Houdart | B60P 3/34 74/422 |
| 3,560,042 | A | * | 2/1971 | McCarthy | B60P 3/34 296/170 |
| 3,888,539 | A | * | 6/1975 | Niessner | B60P 3/34 296/156 |
| 4,449,746 | A | * | 5/1984 | Clark | A61B 6/4488 280/763.1 |
| 4,964,671 | A | * | 10/1990 | Millar | B60N 2/242 296/178 |
| 5,061,001 | A | * | 10/1991 | Madden | B60P 3/34 296/171 |
| 5,706,616 | A | * | 1/1998 | Fernandez | B60P 3/0252 296/24.3 |
| 6,126,218 | A | * | 10/2000 | Karhumaki | B60P 3/0252 296/21 |
| 6,299,229 | B1 | * | 10/2001 | Becenas Nieto | B60P 3/025 296/24.3 |
| 6,497,442 | B1 | * | 12/2002 | Wacker | B60P 3/14 296/24.32 |
| 6,729,678 | B1 | * | 5/2004 | Atcravi | B60P 3/34 296/165 |
| 7,347,472 | B2 | * | 3/2008 | Pellegrin, Jr. | A61G 3/001 296/24.38 |

(Continued)

*Primary Examiner* — Gregory A Blankenship
(74) *Attorney, Agent, or Firm* — Jason P. Mueller; FisherBroyles, LLP

(57) ABSTRACT

This invention refers to a mobile room, which is designed to expand its interior spaces through a mechanism driven by a motor, which can be used as an auditorium or conference room, and can be installed temporarily in areas where there are no rooms or conventional audiences.

41 Claims, 18 Drawing Sheets

(56) References Cited

U.S. PATENT DOCUMENTS

| | | | | |
|---|---|---|---|---|
| 8,720,125 | B2* | 5/2014 | Andretich | B60P 3/00 |
| | | | | 52/79.5 |
| 9,328,957 | B1* | 5/2016 | Feinstein | F25D 31/002 |
| 2002/0047291 | A1* | 4/2002 | Crean | B60P 3/34 |
| | | | | 296/168 |
| 2004/0150240 | A1* | 8/2004 | Koren | B60P 3/34 |
| | | | | 296/26.01 |
| 2005/0161974 | A1* | 7/2005 | Atcravi | B60P 3/34 |
| | | | | 296/164 |
| 2005/0184546 | A1* | 8/2005 | Kunz | A47B 21/0073 |
| | | | | 296/26.01 |
| 2006/0267363 | A1* | 11/2006 | Crean | B60P 3/34 |
| | | | | 296/26.13 |
| 2007/0102946 | A1* | 5/2007 | Blackwell | B60P 3/14 |
| | | | | 296/24.38 |
| 2009/0134663 | A1* | 5/2009 | Hickam | B60P 3/0255 |
| | | | | 296/171 |
| 2010/0276651 | A1* | 11/2010 | Fought | B60P 3/36 |
| | | | | 254/89 R |
| 2012/0096775 | A1* | 4/2012 | Allison | E04B 1/3442 |
| | | | | 52/7 |
| 2012/0153667 | A1* | 6/2012 | Raber | B60P 3/34 |
| | | | | 296/162 |
| 2015/0102632 | A1* | 4/2015 | Pham | B60P 3/34 |
| | | | | 296/175 |
| 2015/0107164 | A1* | 4/2015 | Jung | E04H 3/28 |
| | | | | 52/7 |
| 2015/0151799 | A1* | 6/2015 | Cantin | A61L 2/00 |
| | | | | 296/24.38 |
| 2018/0170235 | A1* | 6/2018 | Millis | B60P 3/34 |
| 2018/0194264 | A1* | 7/2018 | Huntimer | E04H 15/00 |
| 2020/0017014 | A1* | 1/2020 | Lopez | B60P 3/36 |

* cited by examiner

TRANSFORMABLE MOBILE ROOM

PRIORITY INFORMATION

This Application claims priority to Mexican Patent Application No. MX/a/2018/008610, filed Jul. 12, 2018, the entire contents of which is incorporated herein by reference.

DESCRIPTION

This invention refers to a mobile room, which is designed to expand its interior spaces by means of a push and displacement mechanism, driven through at least one of an electric, pneumatic, hydraulic or any other type of motor.

It transforms into a forum that can be, for example, a cinematographic room with capacity for around 91 people comfortably seated, expandable box office for sale of tickets and products. It also has a candy store, restrooms for men and women, illuminated billboard, access and emergency ramps, security handrails, outdoor lighting, air conditioning equipment, water tank for supplying bathrooms, film projector operated by remote control, folding projection screen, removable electric power plant, electric-driven fixed and mobile leveling supports and folding protection awning. As a result, the transformable mobile room has the latest audio and video technology.

PURPOSE OF THE INVENTION

The purpose of the present invention is to disclose a mobile room, which can be transformed and transported. Such room can be used as an auditorium or conference room, and can be installed temporarily in areas where there are no conventional rooms or auditoriums.

Another purpose of the invention is to provide a suitable space for mounting an auditorium that can be one of an exhibition hall, a conference room, a classroom, a fashion show walkway or other type of forum.

Another purpose of the invention is to provide a cinematographic room or mobile cinema auditorium, which can be temporarily transported and installed in areas where there are no cinematographic rooms or where film screening rooms or temporary auditoriums are required, with the ability to provide an excellent accommodation in terms of comfort and operability to an audience of a size similar to that of a small cinematographic room, thus avoiding large investments required for permanent installations.

Still another purpose consists of providing equipped facilities to carry out work tours, promotional tours of products and/or services as well as the diffusion of the invention itself for different cultural and entertainment applications.

These and other objects, features and advantages of the invention will be more clearly appreciated as a result of the detailed description of the invention, which is presented below.

FIELD OF THE INVENTION

The present invention relates to the film and entertainment industry in general, particularly to a mobile room which is capable of being easily transformed and transported by conventional ways and which—once located in the desired location—is transformed into a cinematographic room, for example, with practically all the facilities and characteristics of conventional cinemas. And once the screening session is finished, to conduct the same procedure and tow it to another place where required.

BACKGROUND OF THE INVENTION

Since the appearance of the first film screening, there has been a worldwide and continuous growth in its demand, both for larger spaces and for a greater number of places where films can be screened. However, experience shows us that the construction of cinemas invariably occurs only in towns where the number of actual and potential spectators is such that it justifies the enormous investment of economic resources that this type of building requires.

Even when film fans can be found almost anywhere, only those who live in middle-sized and large cities, or in surroundings thereof, have quick and easy access to this type of show, thereby leaving out all those inhabitants outside said urban centers.

One way of making movies available to the population centers lacking formal cinematic theatres has been to temporarily enable auditoriums, school classrooms or other similar premises as a cinema, using only a cinematographic projector and sound equipment, which most of the times is very rudimentary.

Thus, the need for a tractor truck whose trailer is transformed by an electromechanical pushing system through arms, in a cinematographic room to comfortably accommodate 91 people, is observed. This room has all the conveniences of a modern conventional cinematographic room, such as candy store, box office, ladies and gentlemen restrooms, air conditioning equipment, professional audio and video equipment, among others.

DETAILED DESCRIPTION OF THE PREFERRED EMBODIMENTS

Figure 1:
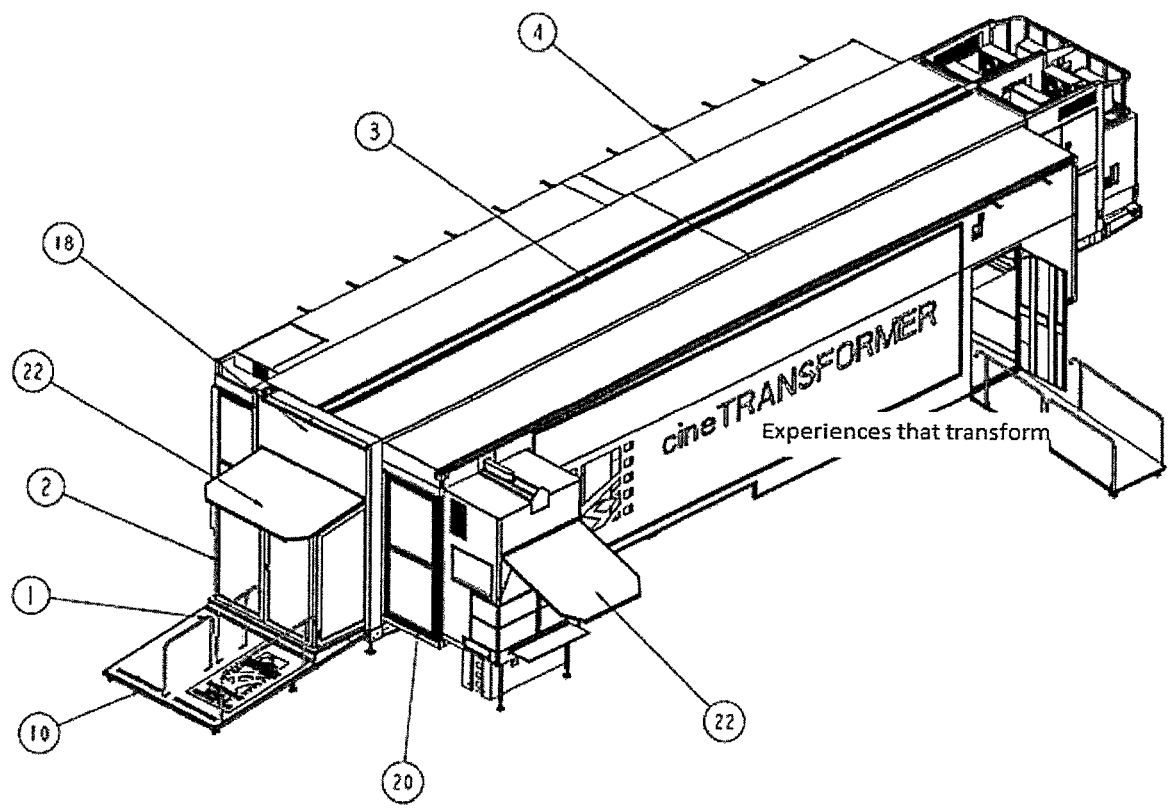
FIG. 1 is an isometric view of the transformable and transportable mobile cinematographic room.
Figure 2:
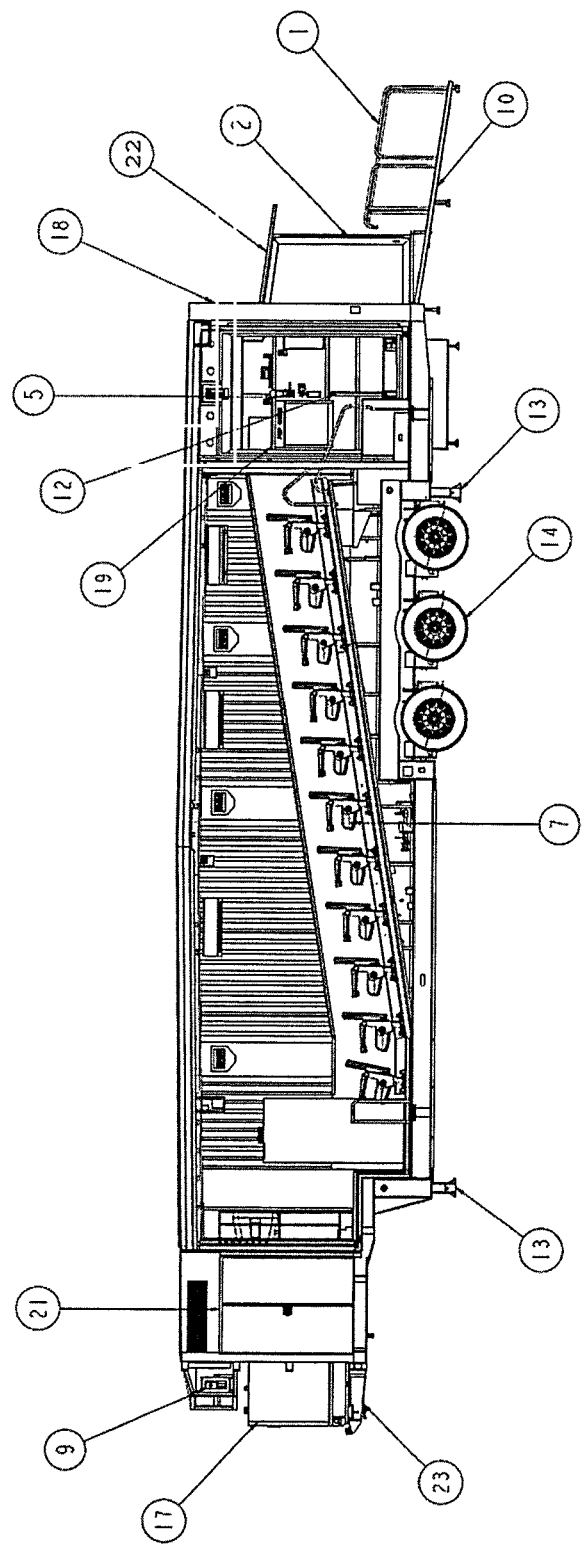
FIG. 2 is a side view illustrating the interior of the cinematographic room showing the right perspective of the invention with the ramp and box office unfolded.
Figure 3:
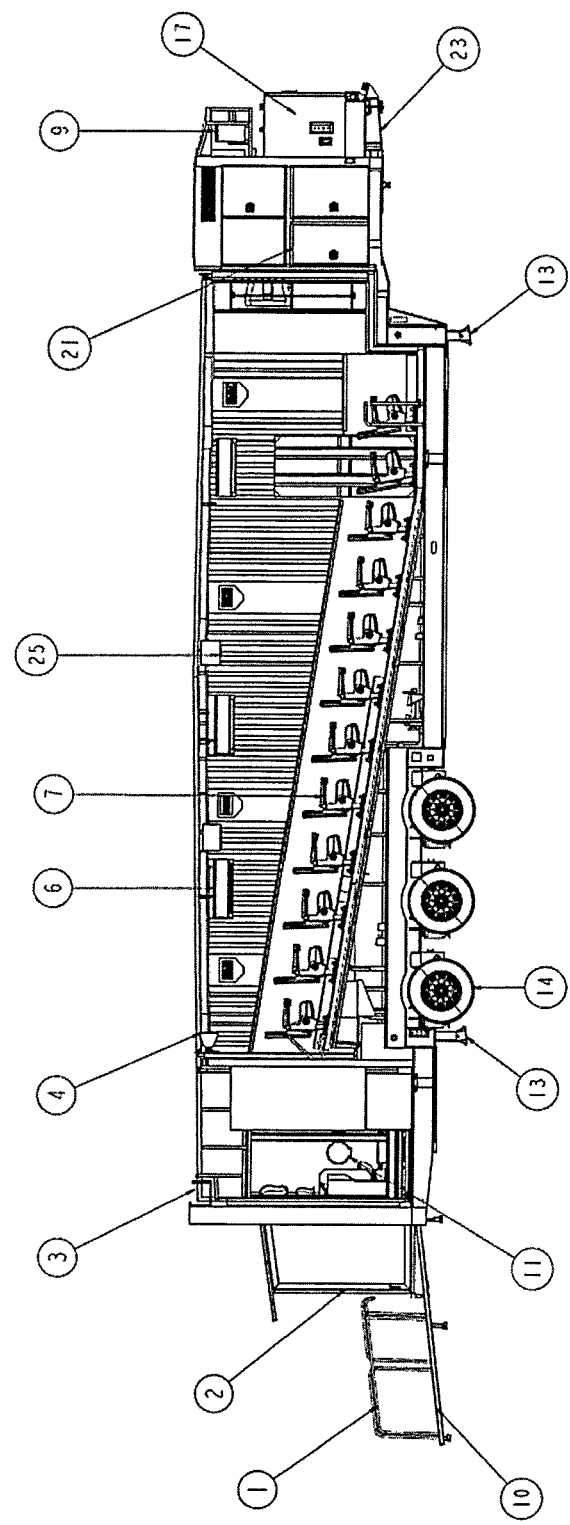
FIG. 3 is a side view illustrating the interior of the cinematographic room showing the left perspective of the invention with the ramp and box office unfolded.

The mobile cinematographic room—hereinafter referred to as a transformable mobile room (TMR)—comprises the following basic elements: a fixed support sub-assembly (3), consisting of a basic frame, similar to that of a trailer of a tractor truck and which is formed by a chassis (26), a platform and a roof structure of the trailer (FIG. 1). The fixed support sub-assembly (3) is practically the backbone that supports all the elements that make up the TMR. Said sub-assembly houses two mobile sides associated with respective roof and floor portions, as well as front and rear walls.

Figure 15:
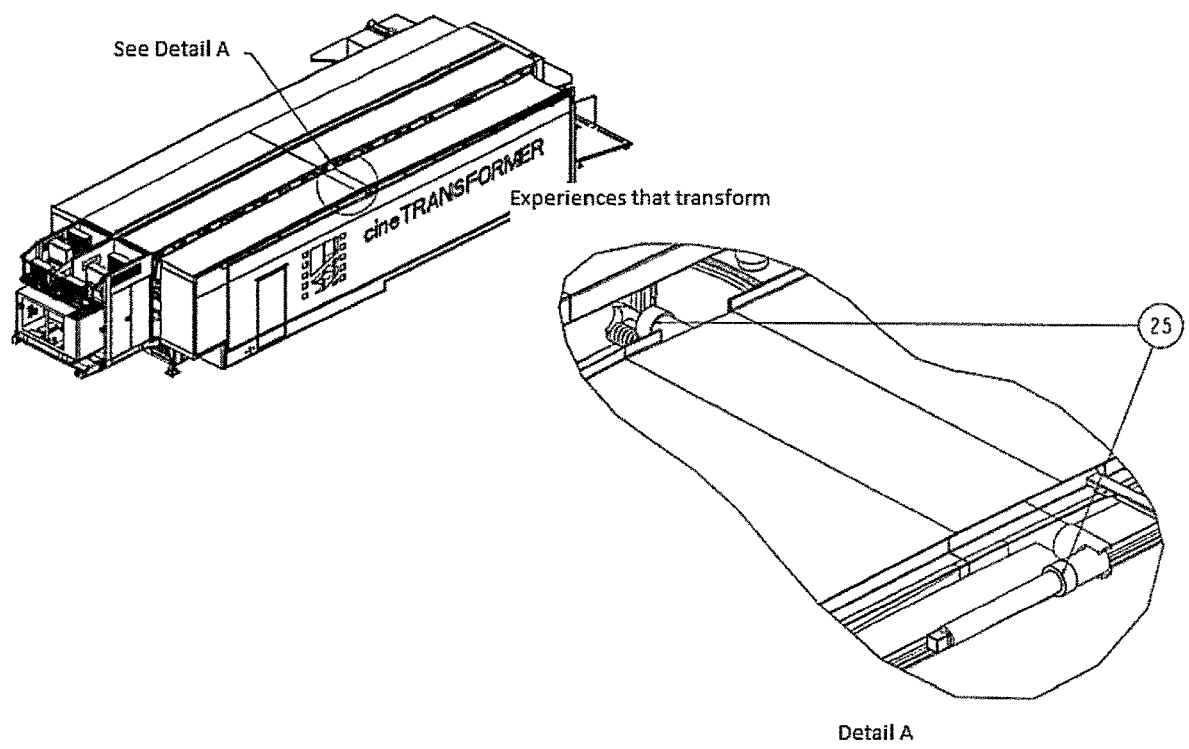
FIG. 15 shows the location of the lateral hooks as soon as the unit is in use.
Figure 15A:
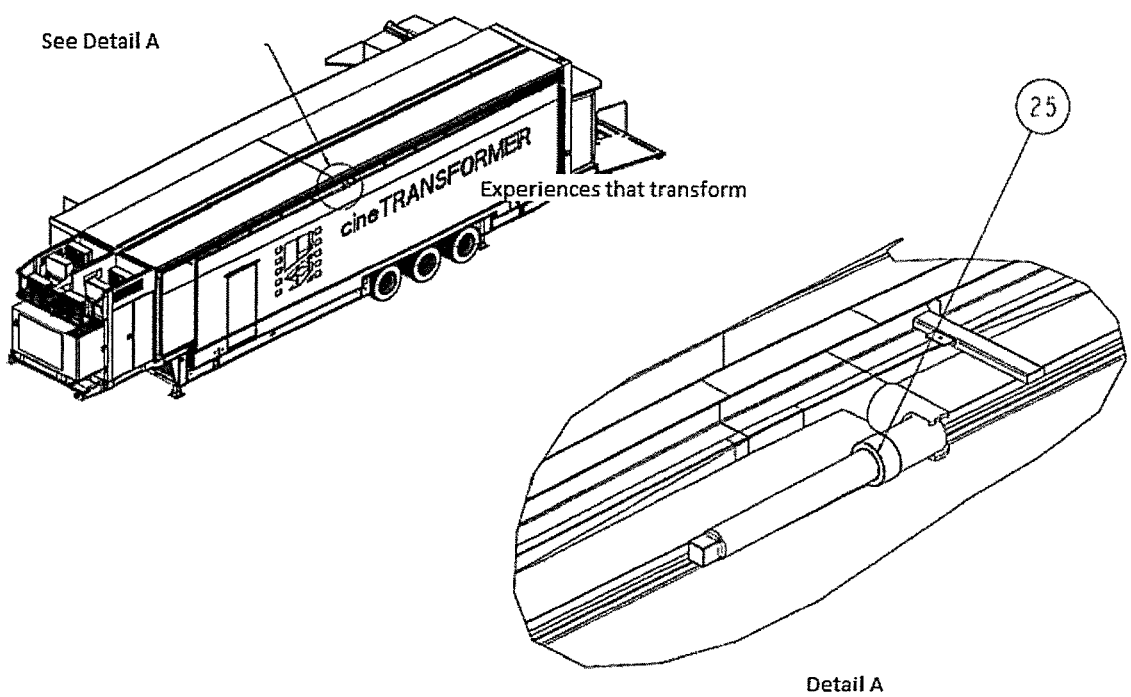
FIG. 15A shows the location of lateral side hooks in travel mode.

As can be seen in FIG. 15, the fixed support sub-assembly (3) substantially integrates the chassis, bridges and side beams in a single body, practically on the same horizontal plane. This has two very important main purposes. The first one reduces the space that exists between the floor of the room itself and the chassis (26) to the maximum. By bringing the floor of said room closer to the chassis, the overall structure of the cinematographic room is considerably simplified, while the interior space thereof is enlarged. This even reduces the external height of the fixed support sub-assembly (3), in comparison with cinematographic rooms of the state of the art.

Another purpose of the aforementioned configuration is that by integrating the chassis (26) into a single body, the bridges (27) and the side beams (28) are conferred to the fixed support sub-assembly (3) with an improved stiffness and structural firmness; this eliminates the susceptibility to vibration and undesirable shifts when the room is at its maximum capacity of spectators compared to rooms from the state of the art.

For the transfer of the unit, it has a king pin at the front, to which the tractor truck is hooked and responsible for moving the unit to its destination.

Once the unit is on a fixed surface, it is ensured that the systems are powered up so that they can descend to the surface in this way and by means of the controllers of the electric skids, thereby ensuring that the unit is leveled. These skids (13) are on the front and rear of the unit.

Figure 13:
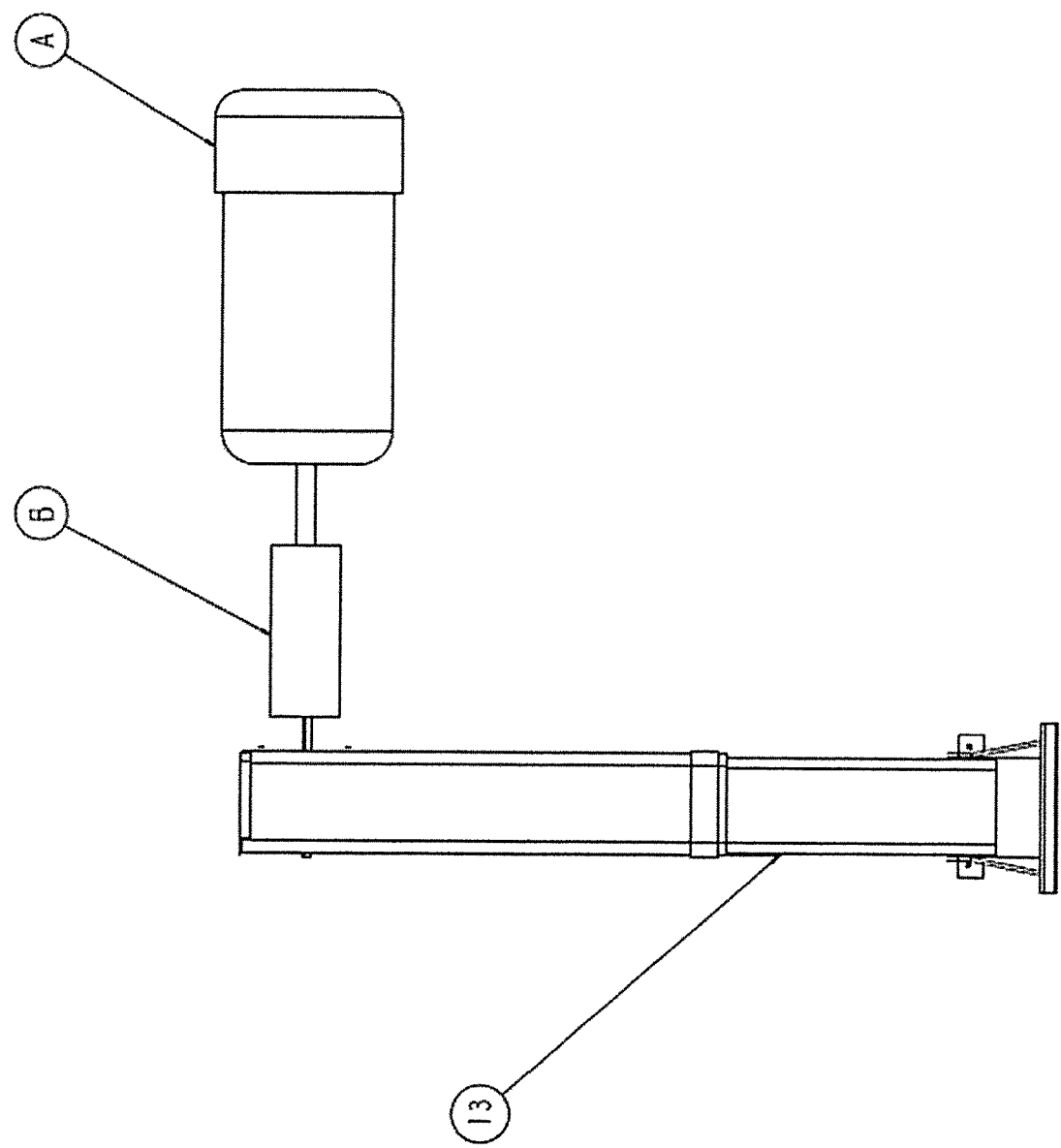
FIG. 13 illustrates the electric skid system which provides the leveling of the mobile cinematographic room.

The function of these skids (13) is to support the structure on which the floor of the auditorium sits when it is full of spectators (FIG. 13). This part of the unit is adapted with a gear motor (A) to the mechanical skid by means of a bushing (B) which move the skid, causing it to move up and down supporting the unit and stabilizing it. This movement is controlled by button panels, levers or any other means that allows the user to give the instruction to raise and lower the skids.

The skids (13) that function as leveling supports cooperate with the tires (14) to support the unit; that is, the skids (13) support the weight of the areas that define the mobile sides when they are opened, thus avoiding twisting of these areas. The operation of said skids can be by means of an electric, pneumatic, hydraulic actuator or similar that can be coupled to the gear motor (A). Preferably, in one embodiment of the invention, the skids are driven by an electric motor.

Figure 11:
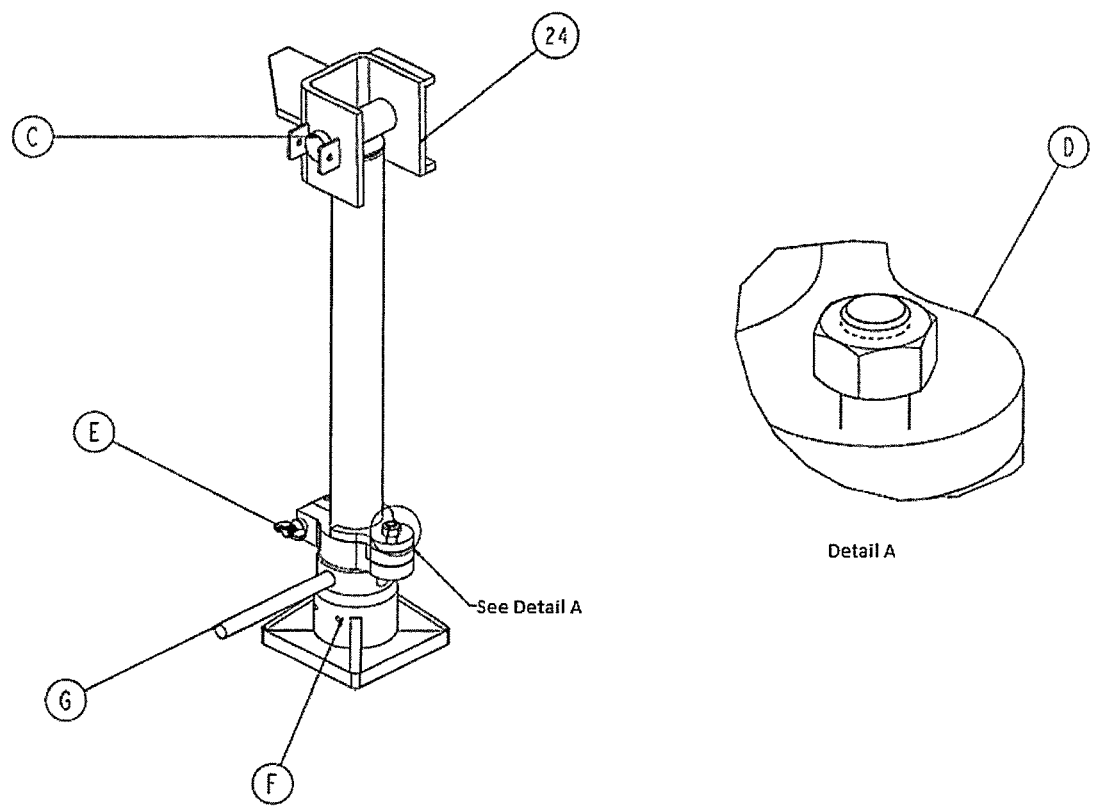
FIG. 11 illustrates the side jacks of the mobile cinematographic room, which help to stabilize the unit when in operation.

Particularly, from FIG. 11, it can be seen that the unit also has side jacks (24) that stabilize the unit. Said jacks (24) can be manually operated, or by means of electric, pneumatic, hydraulic or any other type of actuators, capable of mechanically coupling said jacks (24). The jacks (24) can be housed in the inner part of the lateral side and be supported by a safety bolt (C), or any other means of attachment that fulfils the function of keeping the jacks in a certain position, in such a way that this clamping means is loosened when they are needed. Therefore, the jacks are activated—for example, by turning—by loosening the jaw (D) by means of a screw (E) or any other fastening means for this purpose. When the jaw is loosened, a screw with base (F) is lowered to the floor; once it is on the floor, the jaw (D) is closed and adjusted by means of a lever (G) or by means of any other adjustment means of known in the state of the art to the desired level.

When moving outwards and transversely to the plane on which the sub-assembly extends, the mobile sides (4) define with the latter an interior space of increased dimensions with respect to its travel position, and which is capable of housing a large number of people in a space specially adapted for this purpose and with all the comforts of a modern forum.

The fixed support sub-assembly (3) basically supports three essential areas: an auditorium or cinematographic room; an area of services to the public and an area of operational services. The direction of displacement of the mobile sides towards the outside or the inside of the fixed support sub-assembly (3) is governed by the direction of rotation of the main motor. Said motor can be any actuator capable of providing a movement impulse to the fixed support sub-assembly (3), being coupled by bands (30) or other coupling means such as chains, gears, wheels or any other known in the state of the art. Likewise, the motor can be any type of pneumatic, hydraulic or electric actuator capable of being coupled to the fixed support sub-assembly (3). Preferably, in one of the embodiments of the invention, the motor is an electric motor.

Outside the TMR elements can be found such as: a main access door (2) provided with its respective access ramp (10) with handrail (1), and a canopy arranged above the access door. Likewise, the TMR can include an emergency exit with its corresponding emergency ramp (16) and handrails. Both access and emergency ramps can be raised and deployed when the TMR will provide service, and are retracted when it is to be moved to another location. The operation of said ramps is through electric winches, come-along, hoists or cranes, or any other mechanical device that can be used to pull or release by adjusting the tension of a cable, which have rollers where a cable is wound and unwound or a plurality of cables for the support, deployment and storage of said ramps.

In addition, the main access door (2) has an awning (22), which is a folding structure that protects from the sun or rain for access to the cinematographic room and that once the access doors are closed, they are placed in an upright position to completely close the back of the mobile room.

The TMR has billboards (20) which are structures that are on the back of the expandable sides and whose main function is to promote and show the details of the events and tours that are taking place in the unit or to display any other type of informative, advertising or decorative printed material. These billboards have their own lighting and acrylic protection or any other appropriate material to protect the printed material from inclement weather, with stainless steel mirror-finish edges in or any other material that meets this purpose such as aluminium, steel, plastic, etc. The TMR has canopies (18) located in the upper back part of the mobile room above the awning entrance to the cinema, which serve as a panel for the promotion of film screenings, tours and exclusive events or any other related or necessary information for the purposes of the invention.

In addition, the billboards (20) and canopies (18) can alternatively have strips of lights that make the exterior of the unit shine out once the facility for the functions starts operations, thereby allowing a more pleasant view to the unit or for a better appreciation of the printed material or information displayed on said billboards and canopies. All lighting elements of the TMR can be controlled by switches, sensors, dimmers, timers or any other lighting control element.

Figure 12:
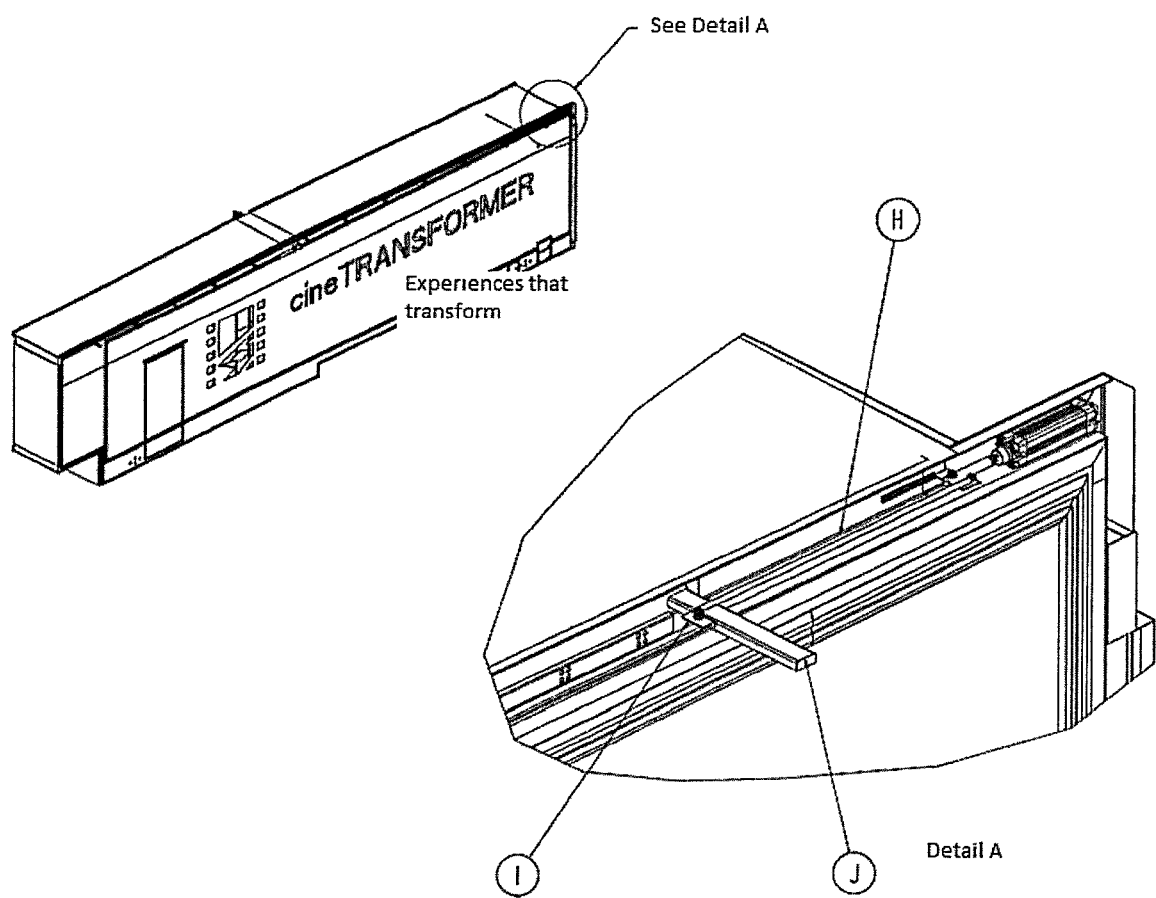
FIG. 12 illustrates the lighting system on the side of the mobile cinematographic room.

The sides of the TMR can also have a lighting system (FIG. 12) that works through an electric, pneumatic, hydraulic or any other similar actuator that moves rods (H) that in turn—by means of ball joints (I)—move the lamp structure (J) to allow it to protrude on the side and illuminate in its entirety, taking full advantage of the lighting provided by each lamp (J).

Additionally, on one of the mobile sides (4), a box office (12) can be located, which can have at least one outer window and at least one outer awning, wherein said at least one awning provides a space with shelter and protection against sun, rain and other inclement weather.

Figure 9:
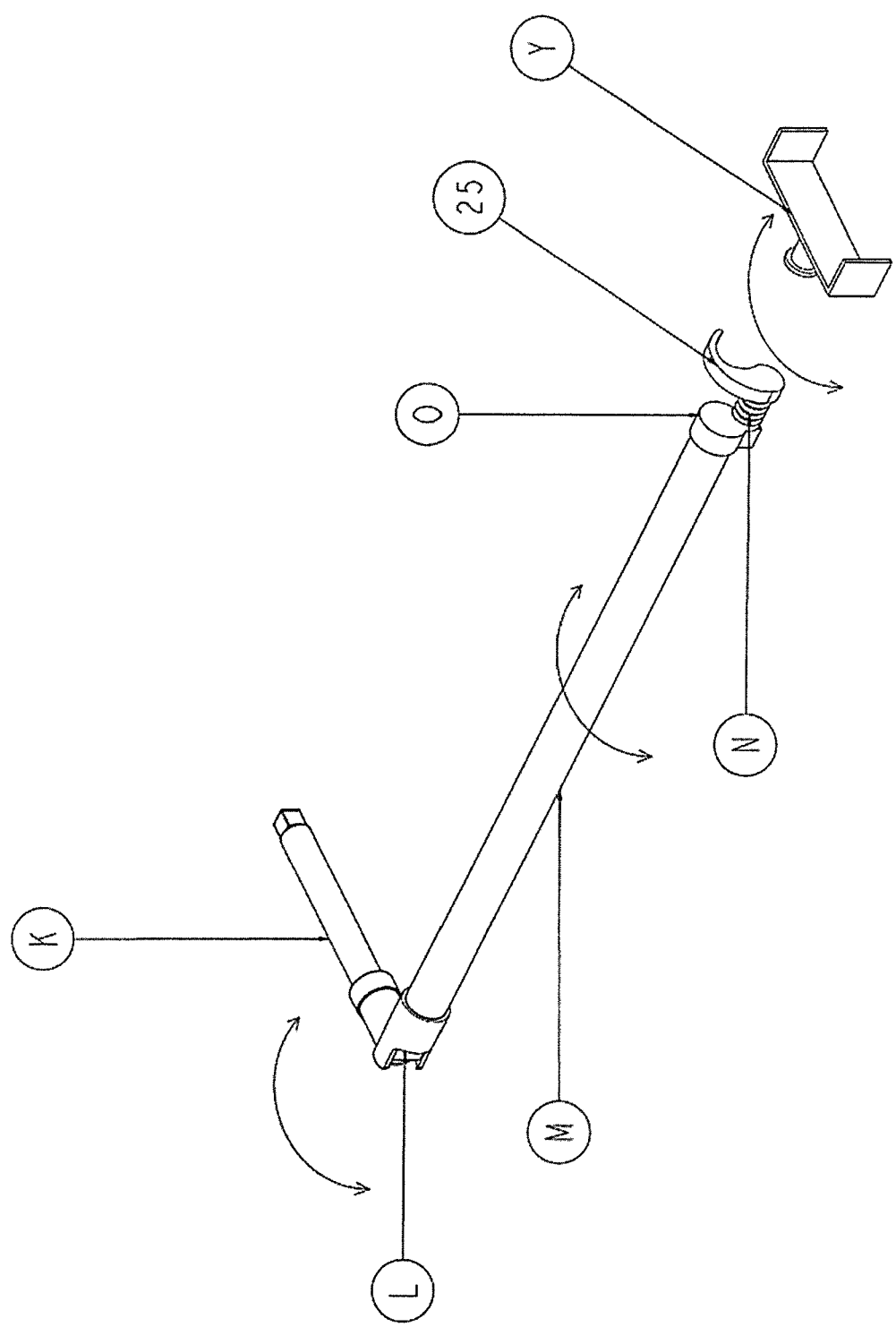
FIG. 9 illustrates the lateral hook system which provides travel mode security of the mobile cinematographic room.

In the part of the roof there are located hooks (25) which are attached to a rocker arm (O), and this in turn to a spring (N), the main function of which is to allow expansion when the unit is in operation and the return of the same in travel mode. This is controlled by a shaft (M), with a mechanical knot (L) that can be mechanically operated by a lever (K) (FIG. 15). The lever has a turning movement of at least 180° either to the right or to the left and moves the knot and, in turn, the rod that makes the movement so that it hooks on the joist pin (Y) and the side is held in travel mode. When the unit must be in trip mode, the main function of the hook, spring and eccentric is to allow the attachment of the side to the roof, in order to provide redundant means of securing the moving parts of the TMR in travel mode and in operation mode, in such a way that the probabilities of an undesired release of the elements and a consequent undesired change of mode of operation as a trip or vice versa are minimized (FIG. 9).

The hooks (25) of the roof (25) can provide greater ridigity to the structure, thus avoiding the possibility of detachment of the structure due to vibrations, derived from the movements of the unit.

Figure 8:
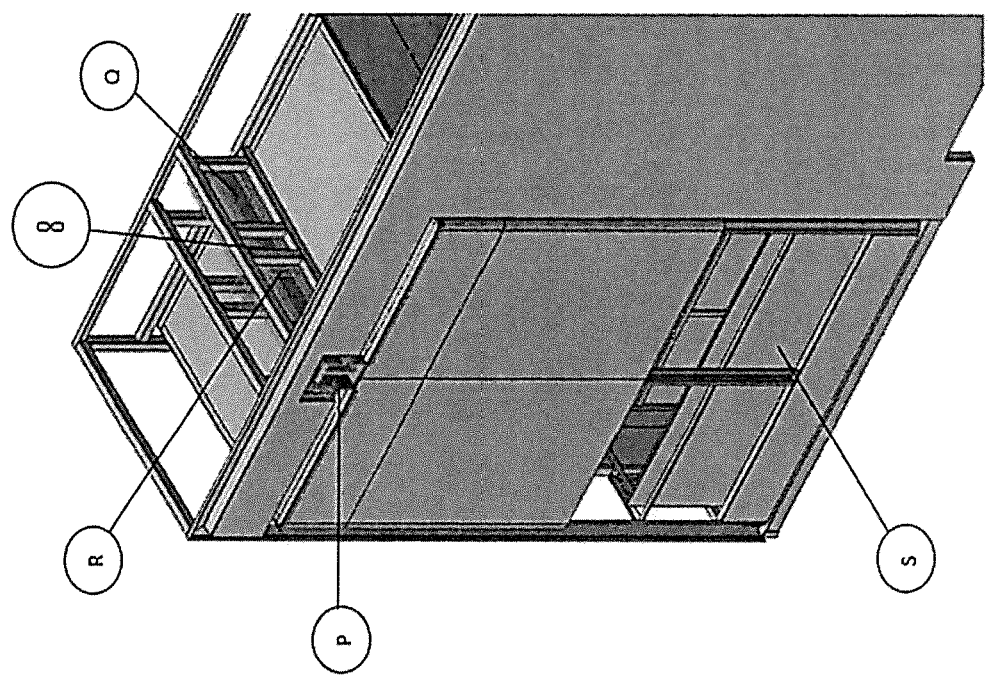
FIG. 8 illustrates the system of expansion of the box office, which is expanded by one of the sides of the mobile cinematographic room, in addition the leveling system of the box office that is expandable through skids thus helping to adapt the box office according to the surface on which it is located.
Figure 8:
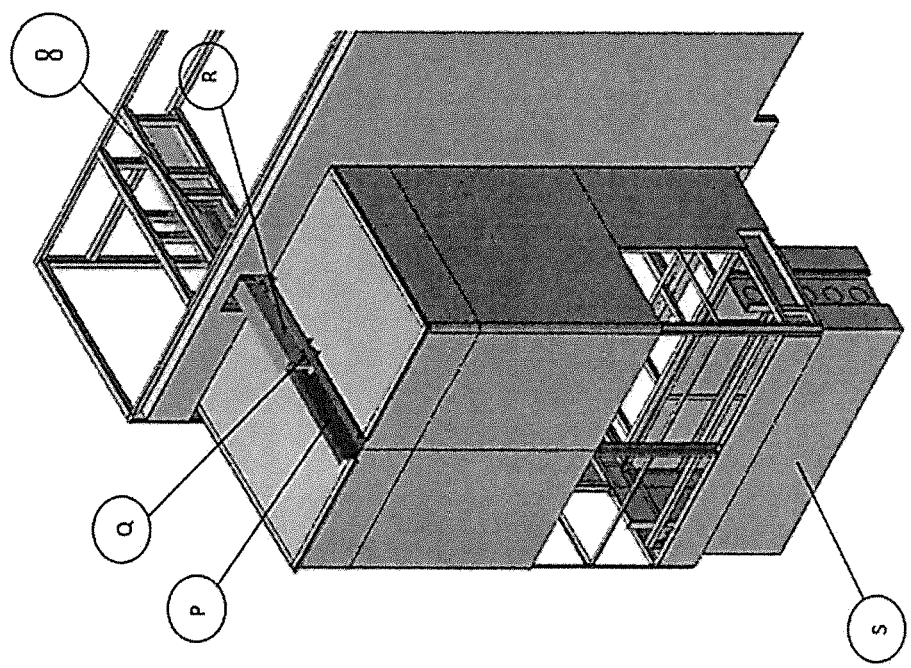

The box office can comprise an expansion system (5) comprised of lifting means (8) that allow it to lower to an appropriate level, so that when the TMR is installed in a place for its operation it becomes expandable (FIG. 8) through a system of sliders (P) that work through trolleys (Q) and a joist (R) with safety locks for sliding the latter. This arrangement allows the locker to slide either in or out of the TMR body, and the box office can be stabilized through skids (13) that facilitate people's access to the box office (12). In this way, when the TMR stops working and is about to be moved to another location, the lifting means (8) raise the box office to an appropriate height, so that the TMR can move freely.

Figure 14:
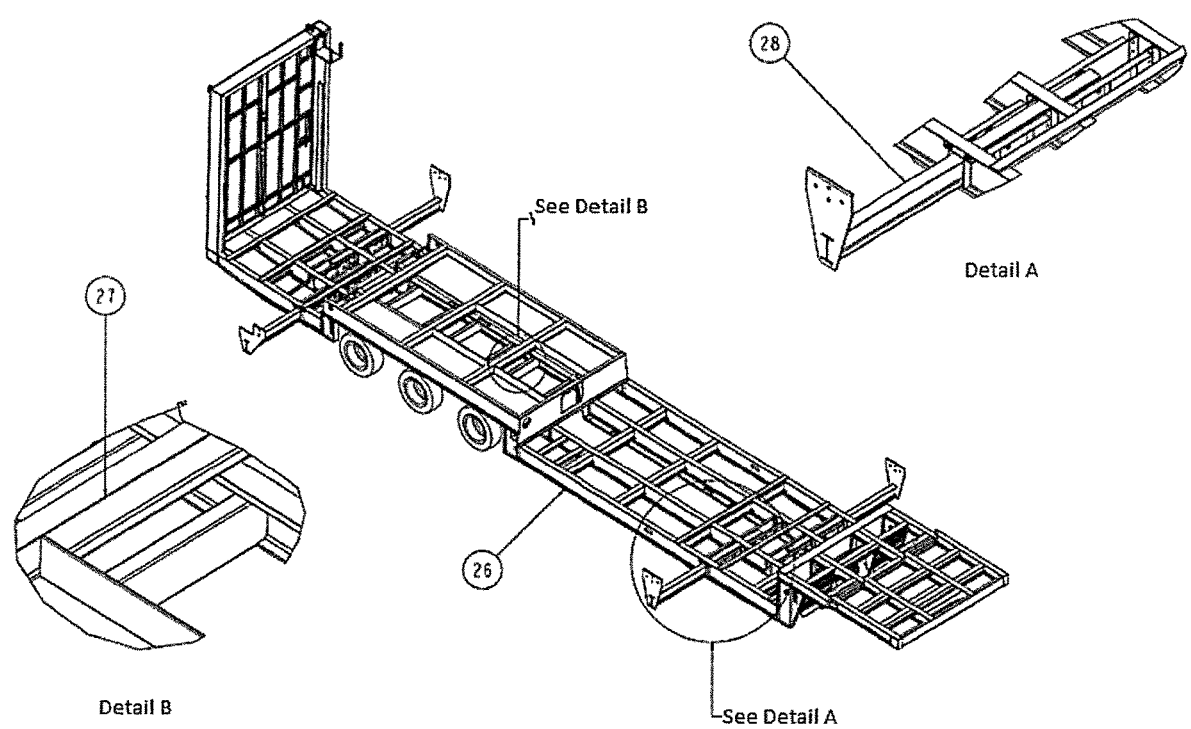
FIG. 14 shows the integration in a single chassis body, beams and bridges that make up the unit.

When the mobile sides move outwardly, the box office (12) is also displaced enough to be released and remains in the lowered position (FIG. 14). In this way, the lifting means (8) are actuated and it is possible to lower said box office (12). Once positioned in the place for operation, it is necessary to remove the safety bolts (C) of the jacks (24), which serve to level the box office (12) according to the surface on which it is located. From the inside of the box office, the box office structure (S) can be lowered by means of a manual winch, which can serve to protect the power supply cable.

The box office may include a screen on its outside to promote the screenings or project any other relevant information for the purpose of the invention.

Figure 10:
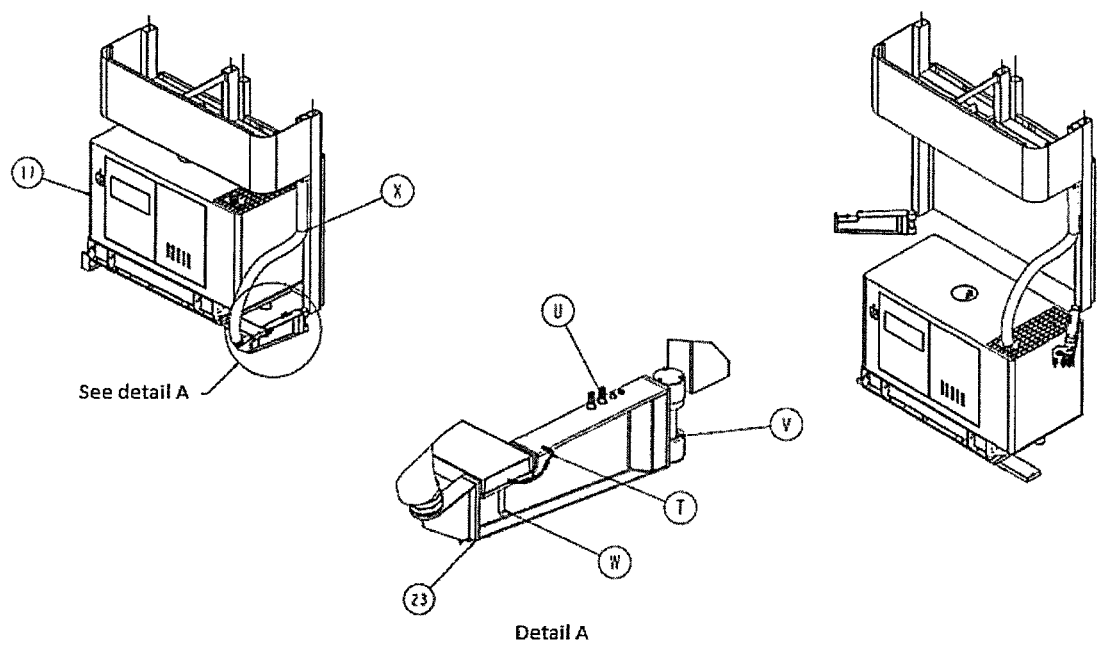
FIG. 10 illustrates the arms of the generator which provides the necessary stability for the power plant, thus avoiding damage by the vibrations of the mobile cinematographic room.

The transformable mobile room can comprise a power plant (17), which can be disassembled once the unit is located in the place for its operation (FIG. 10), which is monitored through a remote control for raising or lowering the same, as the case may be. For the assembly of the power plant, it is necessary to place it on the lateral arms (23) that form a central bolt (T), bushings (U) and bearings (V) to perform the opening or closing movement as the case may be, with the bolts (W) on the base of the power plant in such a way that the bolts cross perfectly both the base and the lateral arms on both sides. This power plant can supply the energy necessary for the operation of the equipment. Once the power plant is placed on the surface, a stainless steel tube (X) or any other suitable material is attached to the exhaust outlet of the plant, which can be led towards the ceiling of the room. This allows the exhaust gases of the power plant to dissipate in the atmosphere at a height higher than that of the room facility, thereby avoiding the accumulation of gases in the area intended for users. Likewise, the power plant can have connectors which provide and give energy to the equipment included in the TMR.

Figure 4:
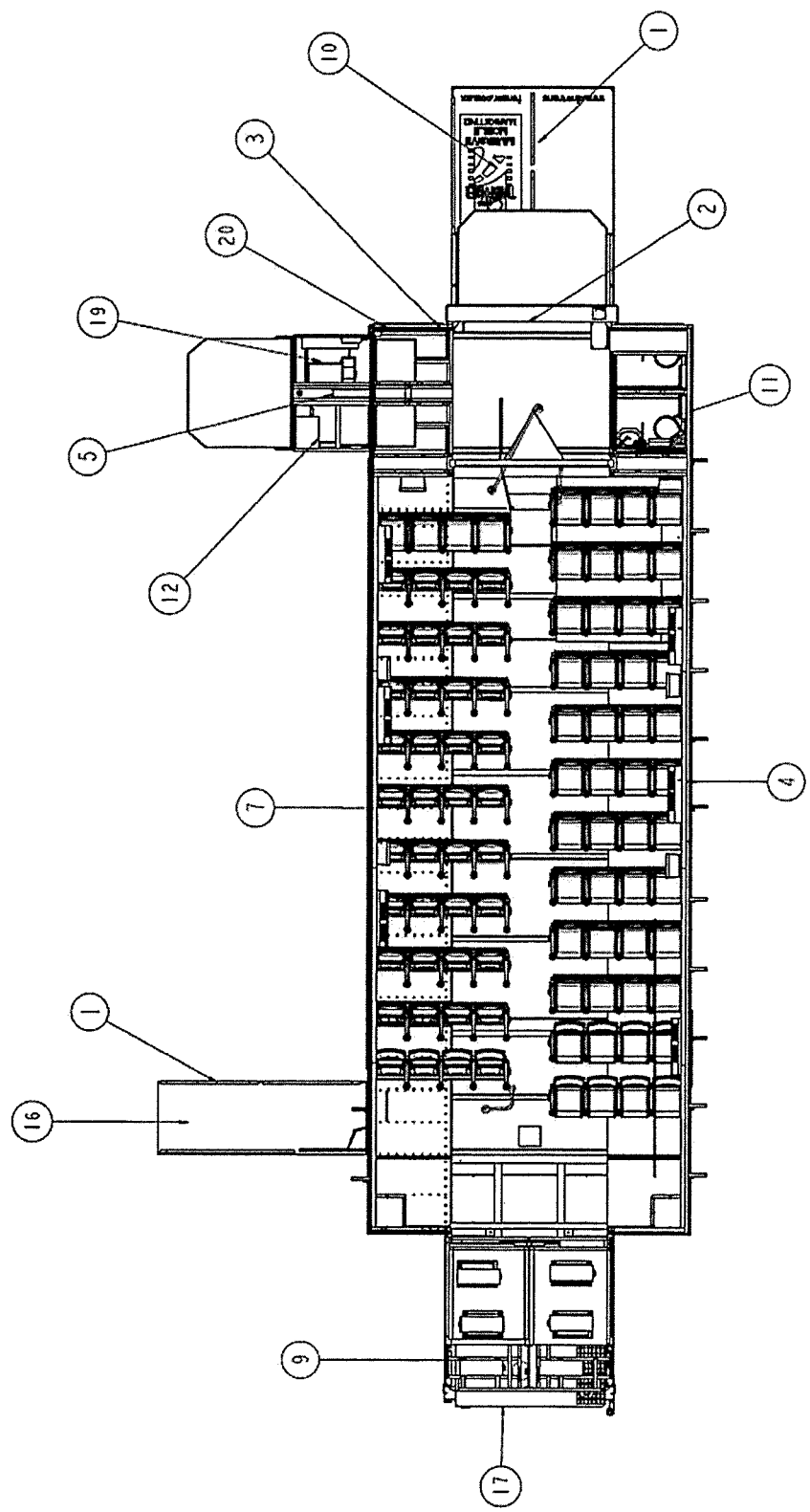
FIG. 4 is a top plan view illustrating the interior of the cinematographic room with its main areas and in its use or deployed position.
Figure 5:
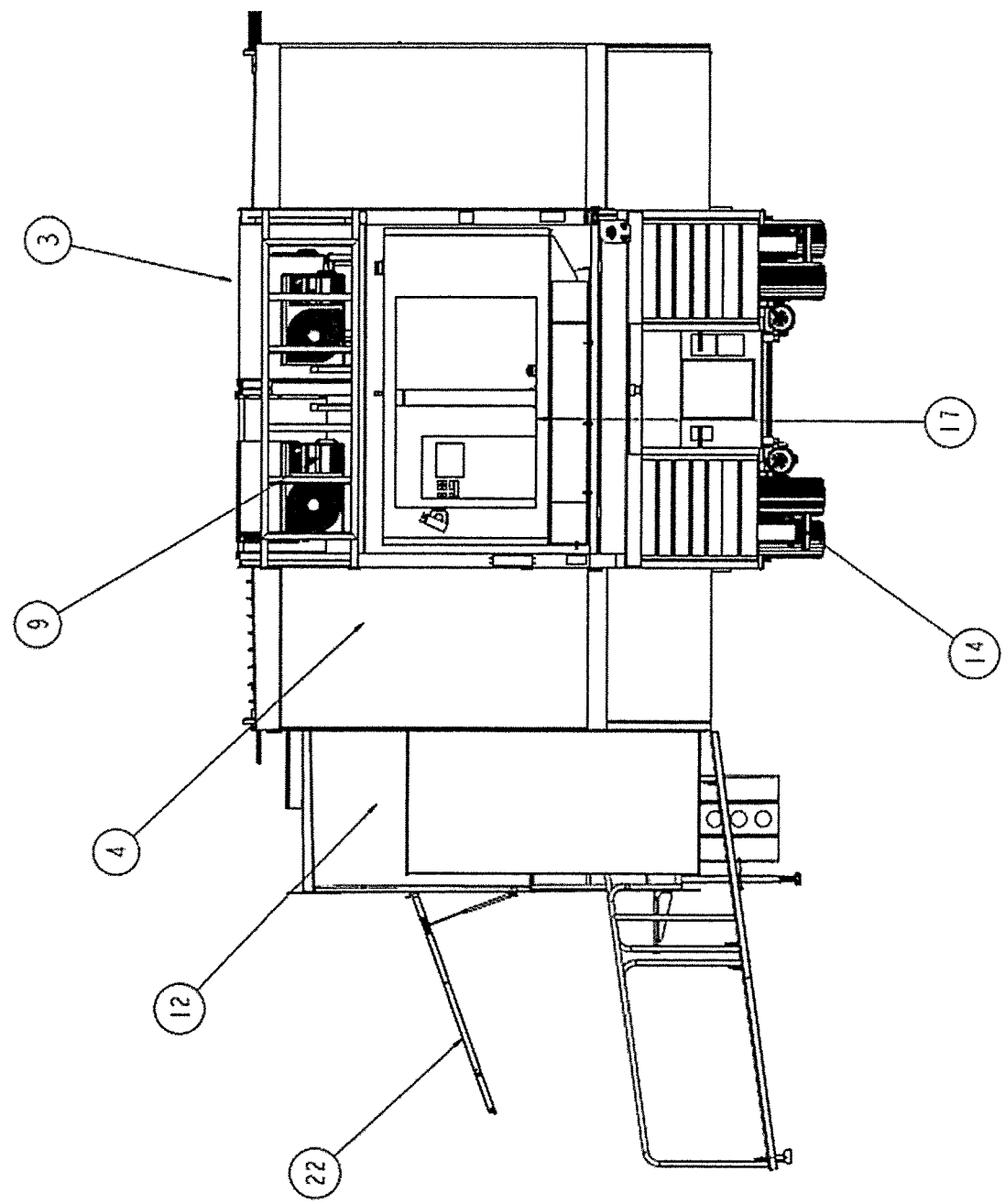
FIG. 5 is a view of the front of the transformable and transportable mobile cinematographic room, showing the box office displayed in its position of use.
Figure 6:
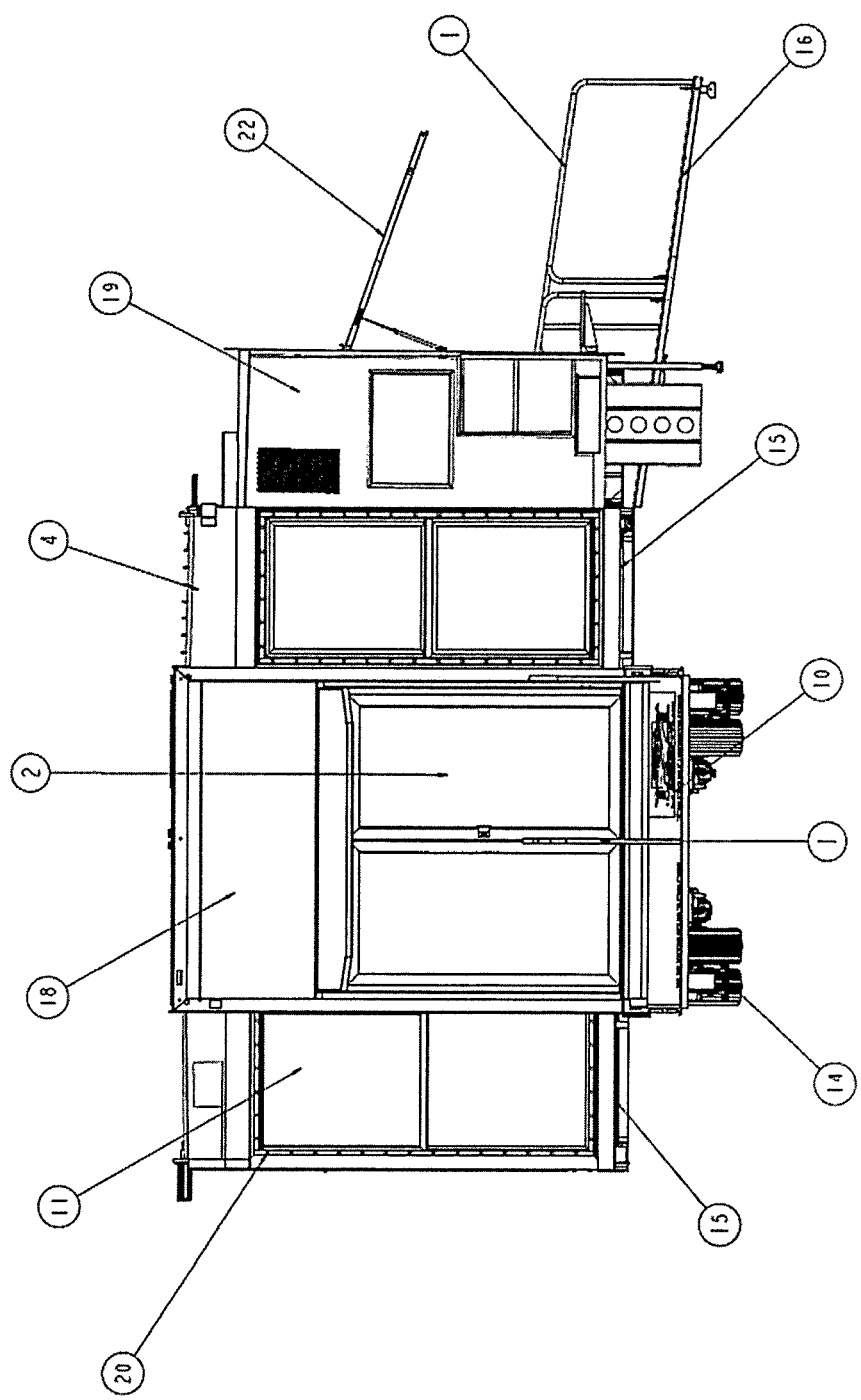
FIG. 6 is a view of the back of the transformable and transportable mobile cinematographic room, illustrating both the emergency exit ramp and the awning deployed.

In a preferred embodiment of the invention—in which it is contemplated that the TMR works as a cinema forum, by way of example the TMR comprises an auditorium in the central part of its interior that includes a seating area (7) comprising lateral formations, separated by a central aisle, arranged on an isoptic floor (FIG. 4), with respect to a projection screen. The TMR also has a small staircase to access the auditorium located in the lobby of the unit.

Likewise, in another example of the interior layout of the auditorium, it is possible to arrange the necessary furniture that allows the assembly, for example, of an exhibition hall, a conference room, a classroom, a fashion show walkway or any other type of forum that requires an interior space with the comforts of a modern forum.

For this purpose, it will only be necessary to make the necessary adaptations to the arrangement of the interior furniture of the TMR, without necessarily changing its mechanical and electrical functioning characteristics.

The TMR can be equipped with a plurality of electronic equipment, for example, audio equipment adequate enough to provide quality audio to the entire auditorium. In an exemplary embodiment, said audio equipment consists of rear speakers, middle speakers, main front speaker, front upper speakers, lower front speakers and a projector. Likewise, in relation to the arrangement of the furniture in a preferred configuration for the cinema, each of the lateral formations of seats (7) comprises a number of rows of chairs of the lateral formation.

Figure 16:
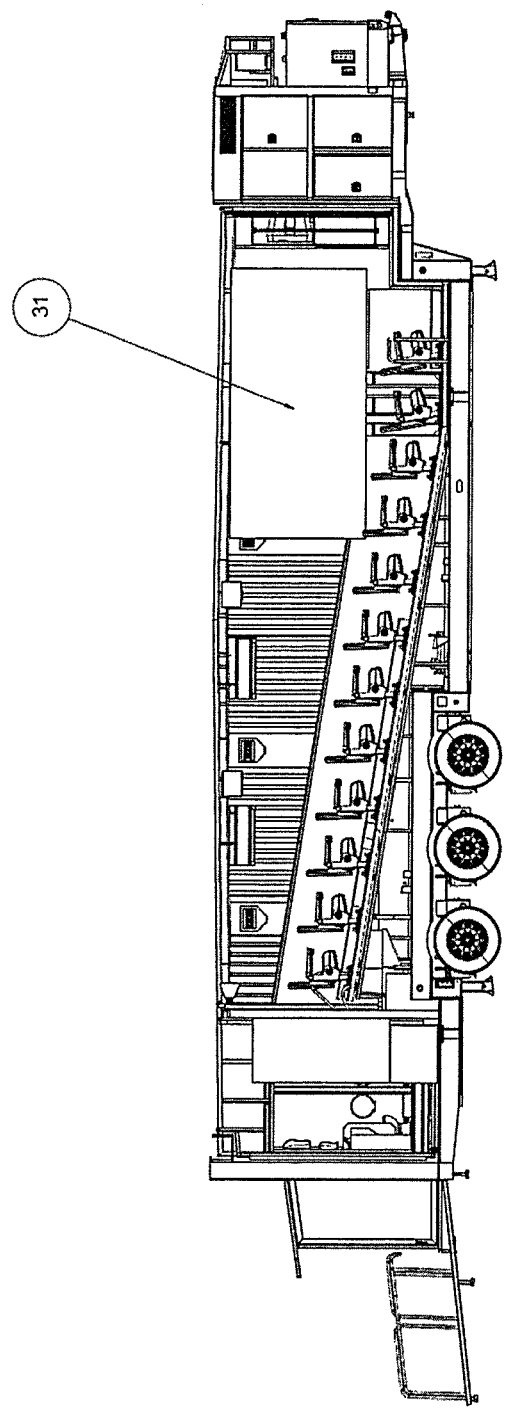
FIG. 16 shows the location of the screen in travel mode.

In the same regard, the TMR can have a projection screen (31) with such dimensions that it extends practically from one mobile side to the other side. When the TMR is in transport position, the structure on which the projection screen (31) is located can be placed on the side of either side of the unit. Additionally, for its operation, it can be furnished with a screen case that is rotated by means of a pivoting element, located in a vertex formed by the mobile side and the rear wall. In this way, the case can be placed on the base of the screen and then the canvas of the projection screen can be deployed to its position of use (FIG. 16).

Alternatively, the TMR can have one or more of a frontal warehouse (21), whose main function is to protect and store various materials that allow the correct functioning of the mobile room. Said area may comprise interior elements and exterior elements. Inside the interior components a water tank, an audio and video control board, a switch panel from where the electric power supplied to the different lines that feed the different equipment of the TMR is controlled, and a starter board to start up the power plant can be found, for example. A water tank such as that of the present invention can be used, among other things to supply the toilets (11). In an exemplary embodiment, said water tank can be made of stainless steel or any other appropriate material and with a design that avoids the swell produced by the movement, in addition to offering resistance to pitting and oxidation. This tank may also distribute water to any other part of the TMR where required. Alternatively, the TMR may also have a storage area to store among other things, for example, an audio and video equipment cabinet, or a rack that allows the proper functioning of the unit's audio and video, as well as any other electronic component that facilitates or needed for the fulfilment of the purpose of the invention; this depends additionally on the configuration of the interior space of the auditorium.

Among the external elements of the operational services area of the TMR there can be at least one power plant (17), at least one lifting mechanism (8) of the power plant and at least one condensing unit (9), among others.

The TMR can also include a public service area such as a candy store (19), with a counter that can be removed easily. The TMR can also include a soda dispenser, restrooms (21) with step for access thereto. The TMR can additionally have wastewater and soapy water reservoirs. Likewise, depending on the desired configuration of the interior space of the auditorium, necessary amenities can be added.

In addition to the projection screen (31), the TMR can contain any number of screens and sound systems that do not affect the cinematographic room and that are necessary or facilitate the goal of providing adequate spaces depending on the configuration of the interior space of the audience.

Figure 7:
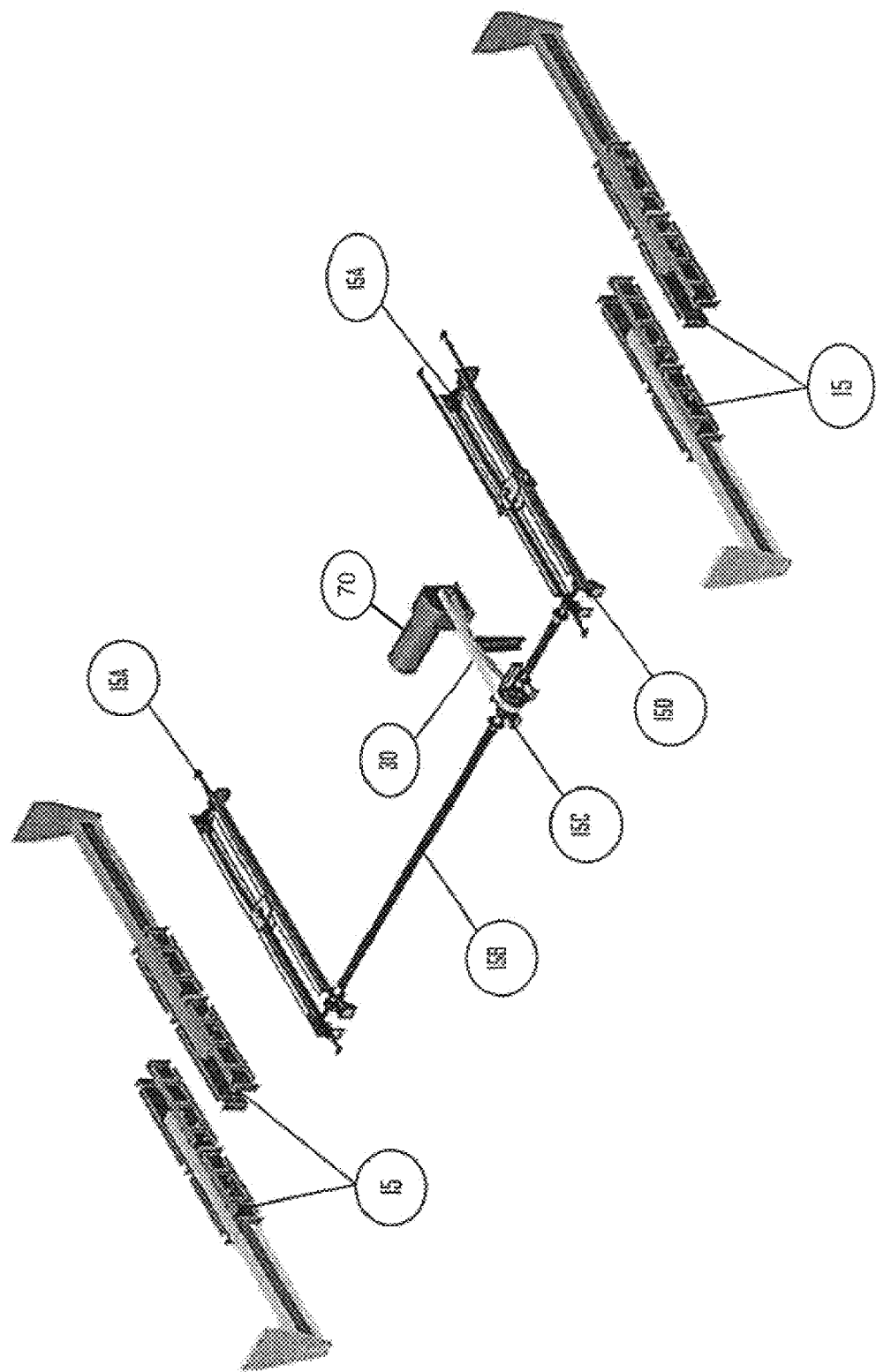
FIG. 7 illustrates the transformation system for the sliding of the mobile sides.

The transformation system (FIG. 7) can be located horizontally on the chassis of the TMR and can be comprised of a gear motor of any type that is adaptable to the transformation system, among other components. The direction of travel towards the outside or downwardly of the mobile sides is governed by the direction of rotation of the main motor (70). To help the displacement of the sides with greater freedom, it has at least a pair of sliding arms for each side. These are located inside the main chassis, they can be parallel to the steel sections thereof, and are attached by a plate and bolts with each side. The sliding arms (28) are at least four in number and are arranged in pairs, one on each side of the longitudinal ends of the TMR floor. These arms comprise "I" shaped beams run in grooves of matching shape and made on the beams of the chassis of the unit.

The sliding arms are formed into force-transmitting arms (15) with at least two pairs, they are movably connected to the TMR and arranged in parallel and run in the opposite direction with respect to their par. Said arms are driven by a main motor arranged horizontally on the TMR, which moves a transmission chain (15A) which transmits angular movement to an shaft (15B) arranged parallel to the axis of rotation of the engine and on journal bearings (15C). The shaft transmits the same direction of rotation, with the same angular velocity, to the shaft corresponding to the other arms. Both pairs of force-transmitting arms (15) are attached to the transmission chains (15A) by sliding guides (15D) that move linearly on a displacement bench. The arms located at the upper segment of the chains—which are attached to a mobile side—transmit the necessary force to move the corresponding mobile side outwardly or inwardly.

The unit can have a basket in the upper front part in which the air conditioning condensing units (19) are protected.

Figure 17:
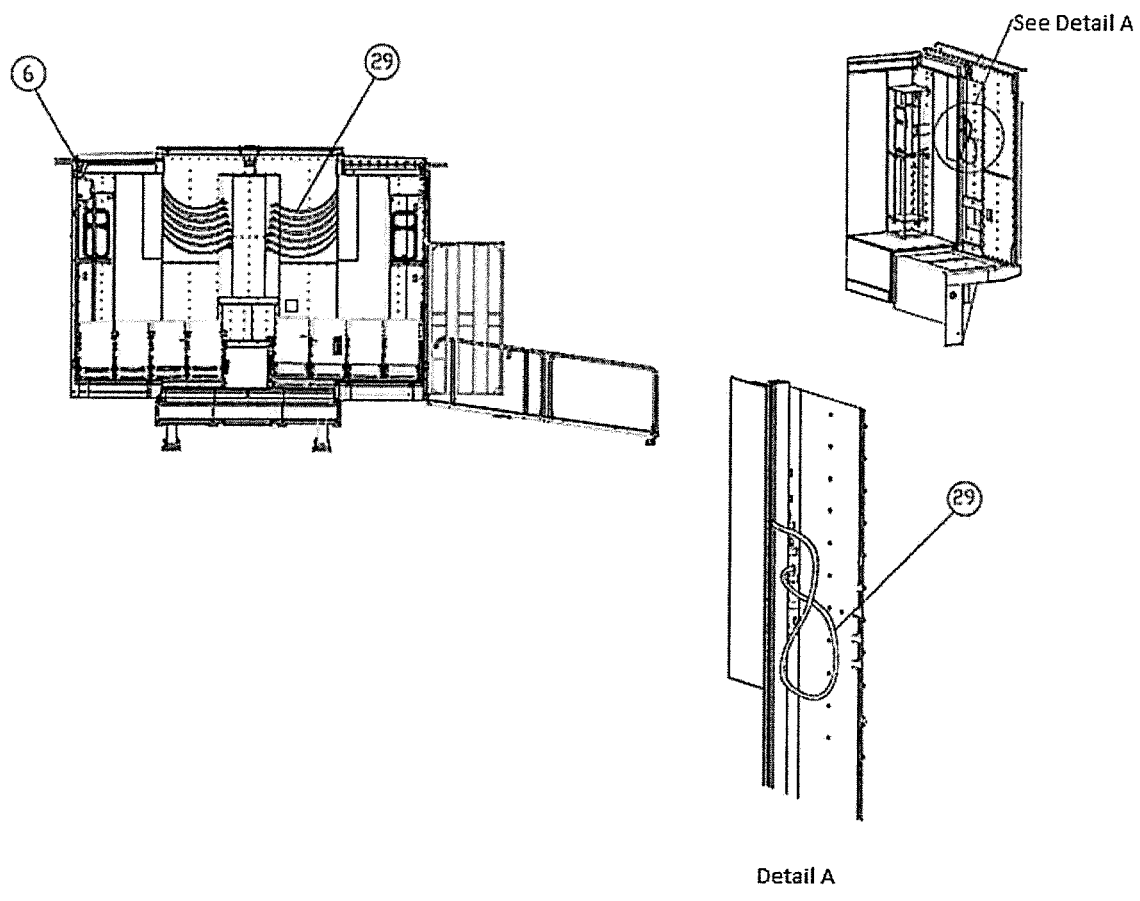
FIG. 17 illustrates the air conditioning system.

The air conditioning equipment comprises at least one condensing unit (19) associated with evaporator units (6), which feed cooled air into the auditorium through hoses (29) and extract hot air to the condensing unit for recirculation. This equipment also provides the candy store area (19), restrooms (11) and box office (12) with such air conditioning, for a greater comfort of the users. This system provides for an improved autonomy of the unit. Likewise, it is arranged in such a way that the hoses (29) attached to the evaporator units (6) with the condensing units (19) provide a flexible coupling, which allows the mobile walls of the TMR to be moved without need of disconnecting the couplings by means of the hoses (19). At the same time, this allows a permanent arrangement of the evaporator units (6) and the condensing units (19). This arrangement facilitates switching between TMR modes without the need for disconnection and subsequent connection of elements of the air conditioning system (FIG. 17).

On the other hand, the TMR has a suspension set consisting of low bed axles, whose purpose is to support the chassis and in general the entire structure of the mobile room.

In order to provide safety for the unit, it is possible to use side plates made of black steel for example, specifically designed for this purpose; this type of plates can increase the safety of the unit in travel mode, and said plates are secured by half of a screw to adjust this to the fixed roof of the unit.

The latter modifications to the invention serve to improve the functioning of the facilities, as well as the maximized use of the spaces. At the same time, the existence of lighter materials nowadays has allowed the exchange of these versus heavier materials, for example the use of steel by fiberglass, carbon fiber and aluminium which are equally resistant, as well as the optimization of energy through the use of electronic saving equipment (LED equipment), the improvement of the quality of the service offered that includes the latest in audio and video equipment technology. All this in order to offer an experience similar to that offered in any world class cinema.

1. A movable and transformable cinematographic room comprising a fixed support sub-assembly comprising a chassis, a platform and a roof structure in operative association with two mobile sides define altogether:
   a) The mobile floors and fixed floor of the room have the exclusive design to obtain a perfect isoptic feature towards the cinematographic screen. The interior space of the auditorium allows for the most convenient arrangement, so that each user has the same possibilities to enjoy the experience provided in the TMR.
b) An area of services to the public that includes restrooms, a candy store and a box office; the latter can be an expandable box office, which when the mobile sides are moved outwardly to place the cinematic projection and public service areas in their position of use, the box office is in a lowering position practically at ground level and, when the mobile unit is retracted, the box office is raised to its original position for transportation to another location.
c) An area of operational services, which includes air conditioning, water supply and control panels, in addition to at least one electric power plant equipment, which has lateral arms that allow the plant to be secured in such a way that it does not affect its operation when the mobile unit moves to another location. This power plant supplies the energy necessary for the operation of the equipment.
2. The main motor and the transformation system are located in the lower central part of the fixed support sub-assembly. The expandable sides have two sliding arms at the ends thereof, which slide by means of a system of hangers and trolleys attached to the central part of the chassis.
3. Steps to access the room, billboards and canopy with independent lighting, electrical leveling supports that level the mobile cinema unit. Supports on the sides that are lowered once they have been opened, both for partial support of the load of the sides.
4. It is furnished with a candy store, lobby, box office, restrooms. Set of surround, professional and subwoofer speakers, folding projection screen, computer room where the audio and projection controls are located. Water tank. Wastewater reservoir, air conditioning equipment for cold and heat, lamps in the room, seat lamps that illuminate the aisle of the cinematographic room. A projector placed on the fixed roof and LED lights located on the outside of the mobile room.

A description of the features and advantages of the present invention in a preferred and exemplary embodiment thereof is presented below, by way of example only and in no way restricting the present invention.

The latest updates and improvements to the unit have achieved technical advantages, such as simplifying its operation to the point of conducting the main operations by pressing a button, since most of these have been automated 100%. Some of these updates include changing levers for buttons or control for the use of the levers of the unit, as well as one of the most significant changes, which is the use of a remote control to open and close the unit. Previously, this was conceived as an idea only, but now that idea has become reality and something tangible. The transportable mobile cinema unit is a fully functional reality in all aspects, from its operation to its simplification. Therefore we conclude the following:

All systems provided for the proper functioning of the TMR are governed by the transport regulations issued by the Ministry of Communications and Transportation (SCT); these systems provide the unit with the autonomy necessary for its operation.

For example, the provision of seats in a preferred embodiment allows an overlap system between the rows of seats, thus avoiding the fact of assembling and disassembling the seats after each presentation.

Also, the invention innovates with a transformation system, which in this way ensures the proper functioning of the unit, and thus preventing the bands (30) from skidding and thereby causing some damage to any person or equipment when they are operating the unit to open and close the same, as the case may be. The unit's main transformation system is now controlled remotely by an electric button control to open the sides of the mobile room or close them. This control is weatherproof, including extension cables to be able to handle it at a distance without major problem. The system comprises, for example, a suitable electric gear motor to be connected to the axles that provide the movement by means of belts, chains or any other suitable means of transmission and bearings. This system and controls are duly indicated within the unit, as well as in the corresponding operating diagrams.

With respect to air conditioning, the present invention exhibits a new coupling system specially designed to meet the needs of the TMR. For this purpose, the system was adapted to make it flexible and rigid: rigid in the sense that the evaporators are embedded in the expandable and flexible part since the compressors are in the fixed part of the unit, and thus achieving a connection between evaporators and condensers both in travel mode while the displacement of the mobile sides towards the outside takes place during the transformation, without losing the connection of both equipment that make up the air conditioning system (FIG. 17).

The structure of the unit can be built, for example, of high-strength steel, based on analysis of the stresses and loads applied to each part of the unit. This provides the necessary information for selection of type of material, caliber and reinforcements that are exerted inside the unit.

The structure may have, for example, an outer lining of a laminated surface of FRP (fiberglass-reinforced plastic) of high resistance to weathering; with this, the cost is reduced in comparison with aluminium white wash sheets previously used, but these offer the same quality. Likewise, other materials can be employed for the lining of the unit, depending on the availability of the same and the characteristics desired for the TMR. In the same way, materials may be adapted depending on the environmental conditions of the places where the TMR is moved or installed.

The interior of the structure can be insulated, for example, with high density polyurethane foam, which allows a more comfortable environment to be enjoyed inside the room. This insulation reduces the amount of noise going through the room. It also reduces the amount of noise generated inside the room towards the outside; it also thermally insulates the room, thereby allowing a certain temperature maintained inside, depending on the conditions of the outside environment. Likewise, other materials may be used depending on their availability, on the desired characteristics of the TMR or on the local characteristics for the use of the TMR.

The equipment installed inside the unit can be the latest in audio and video technology that includes, for example, high fidelity sound distributed throughout the room. The video equipment can have a high-definition projector with the ability to project images in 3-D. All the equipment is controlled from a specific location, which allows remote manipulation of all projection and sound functions with high-tech equipment, such as video players, audio and video controllers and state-of-the-art amplifiers. Likewise, the TMR may have any other electrical or electronic equipment necessary to achieve the purposes desired aimed by the invention, which depend, at least partially, on the configuration of the internal space of the TMR. As an example, chairs with servomechanisms, lamps, computers, shop windows, fans, or any other type of equipment of this kind may be included.

The box office can be equipped with a vending table, awning, 32" external LED screen or any other size that is suitable, mechanical winch to lower the structure, as well as independent contacts to connect some electrical equipment. The structure is designed to be moved manually, so that it protrudes from the expandable side and has a better location for the attention of the users. In this manner, there is more space in the area designated for the candy store, with the counter of the candy shop and popcorn machine being perfectly located, thereby allowing a better and dynamic way of customer service.

The at least one power plant located at the front of the TMR can be dismantled from its place once the cinema unit sits at a fixed location, by means of an electric button control that allows the power plant to be raised from its site or lower it to the surface. This in order to avoid the transmission of noise and vibration from the plant to the cinematographic room.

Additionally, the mobile cinema unit can have at least 4 electric levelers that are also handled by one-button controls to raise them and another to lower them as necessary. This allows the cinema unit to be stable and secure.

The low bed suspension system installed in the TMR allows the proper distribution of the isoptic feature in the preferred embodiment, in which it is arranged as a cinematographic room, with a decrease as well in the maximum height of the unit, to be established within the standard of allowed dimensions and achieve the adequate height of the floor to the chassis efficiently.

In general, all the improvements applied to the TMR unit render this one of the newest and most sophisticated units manufactured today. Also, these units can also have different applications, to be a novel and very useful tool for all companies and for society in general.

Below is a table showing the references corresponding to some of the pieces illustrated by way of example in the figures of a preferred embodiment of the present invention, and mentioned in the specification thereof. Said list shows the elements that make up the invention in an explanatory but not restricting manner. It is assumed that those elements appearing in the figures with no reference number will be clearly identified and recognized by a person with knowledge in the matter.

| No. | Element |
| --- | --- |
| 1 | Handrail |
| 2 | Main access door |
| 3 | Fixed support sub-assembly |
| 4 | mobile sides |
| 5 | expansion system |
| 6 | evaporating units |
| 7 | Seat area |
| 8 | lifting mechanism |
| 9 | condensing unit |
| 10 | entrance ramp |
| 11 | restrooms |
| 12 | box office |
| 13 | skids |
| 14 | tires |
| 15 | Force-transmitting arms |
| 15A | transmission chain |
| 15B | shaft |
| 15C | Journal bearings |
| 15D | sliding guides |
| 16 | emergency ramp |

-continued

| No. | Element |
| --- | --- |
| 17 | power plant |
| 18 | Canopies |
| 19 | candy store |
| 20 | billboards |
| 21 | front warehouse |
| 22 | awning |
| 23 | lateral arms |
| 24 | jacks |
| 25 | hook |
| 26 | chassis |
| 27 | bridges |
| 28 | side beams |
| 29 | hoses |
| 30 | bands |
| 31 | screen |
| A | Gear motor |
| B | bushing |
| C | security bolt |
| D | jaw |
| E | screw |
| F | screw with base |
| G | lever |
| H | rods |
| I | ball joints |
| J | lamp structure |
| K | lever |
| L | mechanical knot |
| M | shaft |
| N | spring |
| O | eccentric |
| P | sliders |
| Q | trolleys |
| R | joist |
| A | box office structure |
| T | central bolt |
| U | bushings |
| V | bearings |
| W | bolts |
| X | tube |

The invention claimed is:

1. A transportable and transformable mobile room that includes:
a king pin to hook the mobile room to a tractor truck for transfer of said mobile room;
a suspension system for low bed axles;
a system of tires for moving the mobile room;
a system for opening mobile lateral parts comprising:
a fixed support sub-assembly comprising a basic frame formed by a chassis, side beams and bridges, a platform and a roof structure of a trailer that forms a space limited by a fixed floor, a fixed frame, and
at least two movable lateral parts, slidable through a fixed part in laterally opposite directions; and
at least one pair of sliding arms, arranged in pairs and corresponding to each of two sides,
wherein said sliding arms are inside a main chassis,
wherein said sliding arms are joined by a plate and bolt arrangement to each corresponding side;
wherein said sliding arms comprise, in turn, at least two pairs of transmitter arms, movably attached to the chassis of the mobile room and arranged in parallel,
wherein at least one first pair of the at least two pairs of transmitter arms runs in the opposite direction with respect to at least one second pair of the at least two pairs of transmitter arms,
wherein said sliding arms are driven by a main motor arranged horizontally on the chassis, said main motor moves a band mechanically coupled to a shaft parallel to an axis of rotation of the motor by means of journal bearings, movement of the shaft causes movement of a transmission chain that transmits angular movement to each pair of sliding arms by sliding guides; and wherein the movement of the transmission chain causes linear displacement of the sliding arms moving the sides of the mobile room outwardly or inwardly.

2. The mobile room according to claim 1, wherein the sliding arms consist of I-shaped beams.

3. The mobile room according to claim 1, wherein said motor is a pneumatic, hydraulic or electric motor.

4. The mobile room according to claim 1, further comprising at least one system of skids located at least in a front and rear of the mobile room, which are able to move vertically in a direction perpendicular to a surface on which said mobile room is stationed, and allow a weight of the mobile room be leveled and held in conjunction with the system of tires, said skid system comprises a set of gear motors adapted to each mechanical skid by means of a bushing that moves the skid.

5. The mobile room according to claim 4, wherein actuation of said skids can be by an electric, pneumatic, or hydraulic actuator that can be coupled to the gear motor.

6. The mobile room according to claim 1, further comprising side jacks for stabilization of the mobile room,
wherein said side jacks are housed in an inner part of the side and are supported by a safety bolt,
wherein when the bolt is loosened, the jacks are activated and loosen a jaw by means of a screw, thereby lowering a screw to the ground,
wherein when reaching the ground, the jaw is closed and adjusted by means of a lever.

7. The mobile room according to claim 1, wherein when the mobile sides are extended, an interior space is defined that can be adapted to mount an auditorium that can be a forum.

8. The mobile room according to claim 1, further comprising at least one folding access ramp with handrails located at a rear end of said mobile room, joined by means of a hinge and a winch to the fixed part of the trailer.

9. The mobile room according to claim 1, further comprising an emergency exit ramp with handrails located at a right side end of the mobile room.

10. The mobile room according to claim 1, further comprising a mobile box office that can be moved outwardly or inwardly of said mobile room by means of a system of slides that work through trolleys and a joist with safety locks for the sliding thereof.

11. The mobile room according to claim 10, wherein said mobile box office may be further moved up and down by means of skids.

12. The mobile room according to claim 11, further comprising a structure that can be lowered by means of a winch.

13. The mobile room according to claim 10, wherein said mobile box office further comprises at least one awning.

14. The mobile room according to claim 1, further comprising a space for a candy store located at a lateral right end of said mobile room.

15. The mobile room according to claim 1, further comprising a space for restrooms located at a lateral left end of said mobile room.

16. The mobile room according to claim 1, further comprising one or more illuminated canopies.

17. The mobile room according to claim 1, further comprising one or more illuminated billboards.

18. The mobile room according to claim 1, further comprising one or more illuminated canopies and one or more illuminated billboards.

19. The mobile room according to claim 16, wherein the one or more illuminated canopies are placed in an upper part of the lobby.

20. The mobile room according to claim 17, wherein the one or more illuminated billboards are placed above an entrance of the cinematographic room.

21. The mobile room according to claim 18, wherein the one or more illuminated billboards are placed in an upper part of the lobby.

22. The mobile room according to claim 18, wherein the one or more illuminated canopies and the one or more illuminated billboards are placed above an entrance of the cinematographic room.

23. The mobile room according to claim 1, further comprising billboards located at a lateral left end of said mobile room.

24. The mobile room according to claim 1, further comprising at least one system of electric skids that support the fixed part of said mobile room when it is disengaged from machine that is towing it.

25. The mobile room according to claim 1, further comprising a folding structure in a main access door at the rear part of said mobile room, wherein said folding structure can be placed in vertical position to completely close a back of the mobile room, which also works as awning when in an opened position.

26. The mobile room according to claim 1, further comprising a lighting system comprising an actuator that moves rods that by means of ball joints move a lamp structure, thereby allowing said lamp structure to protrude on the side of the mobile room.

27. The mobile room according to claim 1, further comprising a system for fixing the sides, comprising hooks attached to a rocker, which in turn joins a spring that expands when the mobile room is in operation and contracts in travel mode, said system is controlled by a shaft with a mechanical knot that can be operated by a lever, wherein said lever has a turning movement of at least 180° that moves the knot and the rod in turn, causing a movement for the hook to become hooked to the bolt on the beam and hold the side during the travel mode.

28. The mobile room according to claim 1, further comprising at least one power plant.

29. The mobile room according to claim 28, wherein said at least one power plant can be disassembled, by means of lateral arms that are formed into a central pin, bushings and bearings that perform an opening or closing movement with bolts on a base of said at least one power plant, so that the bolts pass through the base and the lateral arms on both sides.

30. The mobile room according to claim 29, wherein once placed on the surface, a tube is coupled to the power plant to direct exhaust gases of said at least one power plant above a height of an installation of the mobile room.

31. The mobile room according to claim 1, wherein said mobile room is configured as a cinema forum, and also comprises a projection screen.

32. The mobile room according to claim 31, further comprising an area of seats comprising lateral formations, separated by a central aisle, arranged on an isoptic floor with respect to the projection screen.

33. The mobile room according to claim 32, wherein the projection screen has dimensions such that it extends from one mobile side to the other side of the mobile room.

34. The mobile room according to claim 33, further comprising a structure on which the projection screen is mounted, which can be placed on a side of either side when the mobile room is being transported.

35. The mobile room according to claim 34, wherein the screen has a case that can be seated at the base of the screen and a screen canvas can be deployed from the case to a position of use.

36. The mobile room according to claim 1, further comprising one or more of a frontal warehouse.

37. The mobile room according to claim 1, further comprising an air conditioning system comprising:
   at least one condenser unit associated with at least one evaporator unit, connected by means of flexible hoses that bend when the mobile room is being transported and extend when the mobile room is in use, so that the union between said at least one condenser unit and said at least one evaporator unit is not affected by changing of the mobile room.

38. The mobile room according to claim 1, wherein the side plates of the mobile room are made of black steel.

39. The mobile room according to claim 1, further comprising an outer lining of a laminated surface of fiberglass-reinforced plastic.

40. The mobile room according to claim 1, wherein the mobile room is insulated by means of high density polyurethane foam.

41. The mobile room according to claim 1, further comprising a space for restrooms located at a lateral right end of said mobile room.

\* \* \* \* \*